Nov. 12, 1935. F. GATTA 2,020,885
WHEEL COVER
Filed May 11, 1935
Fig. 1
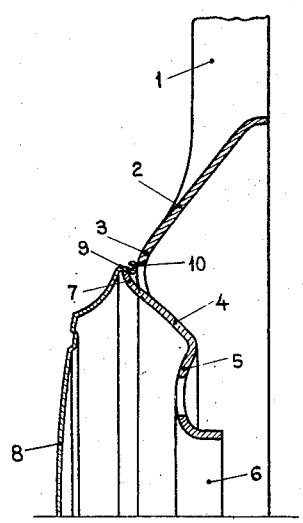
Fig. 4
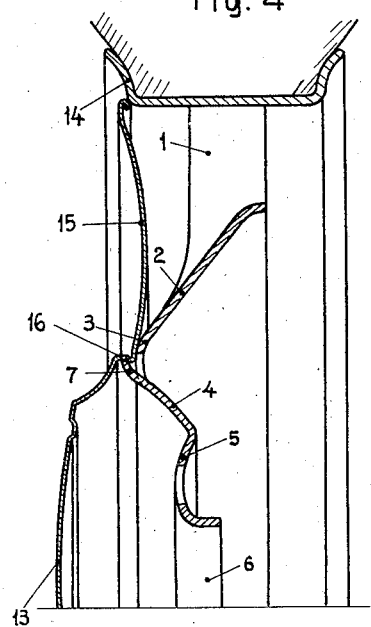
Fig. 3
Fig. 2
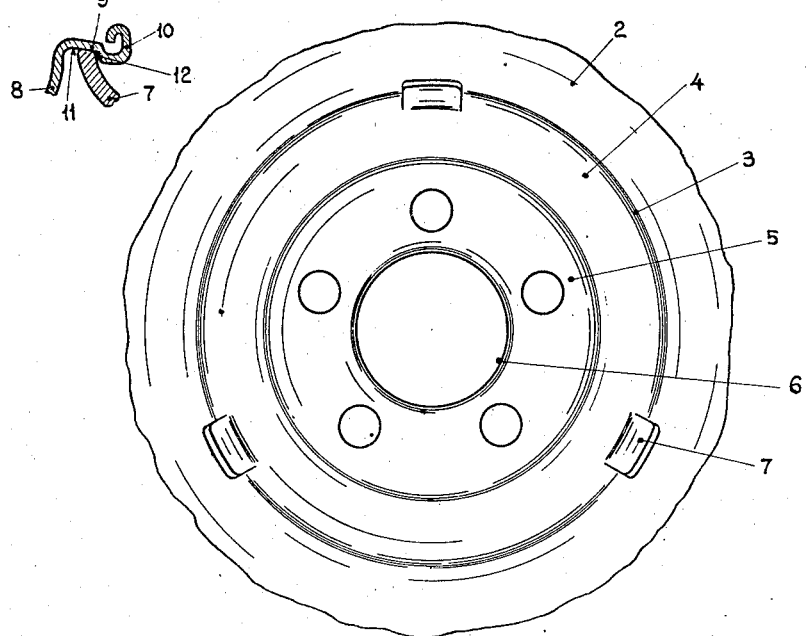
F. Gatta
INVENTOR
By: Glascock Downing Seebold
Attys.

Patented Nov. 12, 1935

2,020,885

UNITED STATES PATENT OFFICE 2,020,885

WHEEL COVER

Filiberto Gatta, Turin, Italy

Application May 11, 1935, Serial No. 21,032
In Italy June 5, 1934

4 Claims. (Cl. 301—37)

This invention relates to a covering and protecting device for motor vehicle wheels and more particularly to a means of securing said device, which is cheap in manufacture and smart in appearance.

The object of this invention is to provide a covering and protecting device which is applied to the hub or other wheel part by pressure in an axial direction and fixed in position by snapping means acting in a radial direction.

Another object of this invention is to provide on the wheel prongs arranged along a circumference and to form in the cover a peripheral groove into which said prongs can be caused to snap by pushing the cover towards the wheel.

Another object of this invention is to provide means for fixing the cover to the hub, which do not require any machining of their mutually engaging surfaces, thus further reducing the cost of manufacture. For this purpose I form on the front end of the wheel by cutting or pressing on one and the same circumference prongs directed under a certain inclination from the center towards the periphery and in the cover a shallow inner groove engaging said prongs when the cover is pushed towards the wheel.

The cover is easily removable by elastic deformation as it can be detached from the wheel by means of a wedge, e. g. the tip of a screw-driver, introduced between the rim of the cover and the wheel.

Another object of this invention is to provide a cover for the wheel hub, of the type above referred to, which extends radially, so as to cover also the spokes or spider of the wheel.

These and further objects of this invention will be more readily understood from the following description where reference is made to the accompanying drawing given by way of example, wherein:

Figure 1 shows the wheel and hub-cover in axial section.

Figure 2 is a view of the wheel, the cover being removed.

Figure 3 shows a detail of Figure 1 on an enlarged scale.

Figure 4 shows a modified form.

The wheel shown on the drawing is of pressed sheet metal construction, in which the spokes 1 extend from a large central disc, having at its periphery a conical surface 2 merging by a circular rib 3 into a conical surface 4 opposed to the former and ending by the rim 5 of which the edge is bent to form a sleeve 6. The wheel is secured by means of the usual holes in the rim 5 to the pins on the hub (not shown).

Three C-shaped cuts are made at 120° from each other in the rib 3 and the prongs 7 formed by each cut is bent towards the outside and the periphery of the wheel. The prongs 7 are situated substantially on the extension of the conical surface 4.

The hub-cover 8 is of thin sheet metal, preferably brass, and has a bead 10 formed at the periphery of a cylindrical or slightly conical portion 9. In the inner surface of the portion 9 is formed a groove 11 (see Fig. 3) such that the diameter measured on its bottom corresponds substantially to that of the circle having its center on the axis of the wheel and passing through the outer edge of the prongs 7. In this manner the prongs can be engaged by the groove in the hub cover by overcoming only the outer step 12 of the groove, this taking place by virtue of the elasticity of the material of the hub cover when the latter is pushed towards the wheel.

It is known that in order to increase riding comfort the trend is to increase the diameter of the cross section of the pneumatic tires and consequently decrease the diameter of the wheel rim; on the other hand, in order to increase safety there is a tendency to increase the diameter of the hub to improve the steadiness of the wheel, this resulting in a considerably reduced length of the spokes. In these circumstances, the hub cover according to this invention can be advantageously modified as shown in Fig. 4 in order to serve also as wheel-cover. In said figure the hub cover 13 extends radially to rest by its periphery on the rim 14 of the wheel and cover the spokes 1 by the annular portion 15, and is fixed to the hub in this case also by means of the prongs 7 engaged by the groove formed in the intermediate annular portion 16 which is cylindrical or slightly conical.

What I claim is:

1. In combination, a wheel including a thick sheet metal part, a thin sheet metal cover for said wheel including an internal groove and rigid prongs partly cut off and turned out from said thick sheet metal part and engaging said groove in said cover.

2. In combination, a wheel including a rigid sheet metal part, an elastic cover for said wheel including an internal groove and rigid prongs partly cut off and turned out from said rigid sheet metal part and engaging said groove in said cover.

3. In a wheel the combination of a sheet metal hub member, an elastic cover member for said hub member pushed towards the prongs on said hub member bent outwardly towards the periphery of the wheel, said prongs being formed by cutting and pressing the sheet metal of the hub, and an annular groove in the cover engaging said prongs when the cover is pushed in an axial direction towards the hub.

4. In a wheel the combination of a rim, a rigid sheet metal hub member, a cover member for said hub member, rigid prongs on said hub bent outwardly and towards the periphery of the wheel, said prongs being obtained by cutting and bending out of the sheet metal material of the hub, an annular groove in the cover engaging said prongs when the cover is pushed axially towards the hub and a radial peripheral extension on the cover beyond said groove, of which the edge abuts said rim.

FILIBERTO GATTA.